No. 869,710. PATENTED OCT. 29, 1907.
V. C. HOWE.
MEANS FOR CONNECTING FLUE SECTIONS.
APPLICATION FILED AUG. 7, 1906.
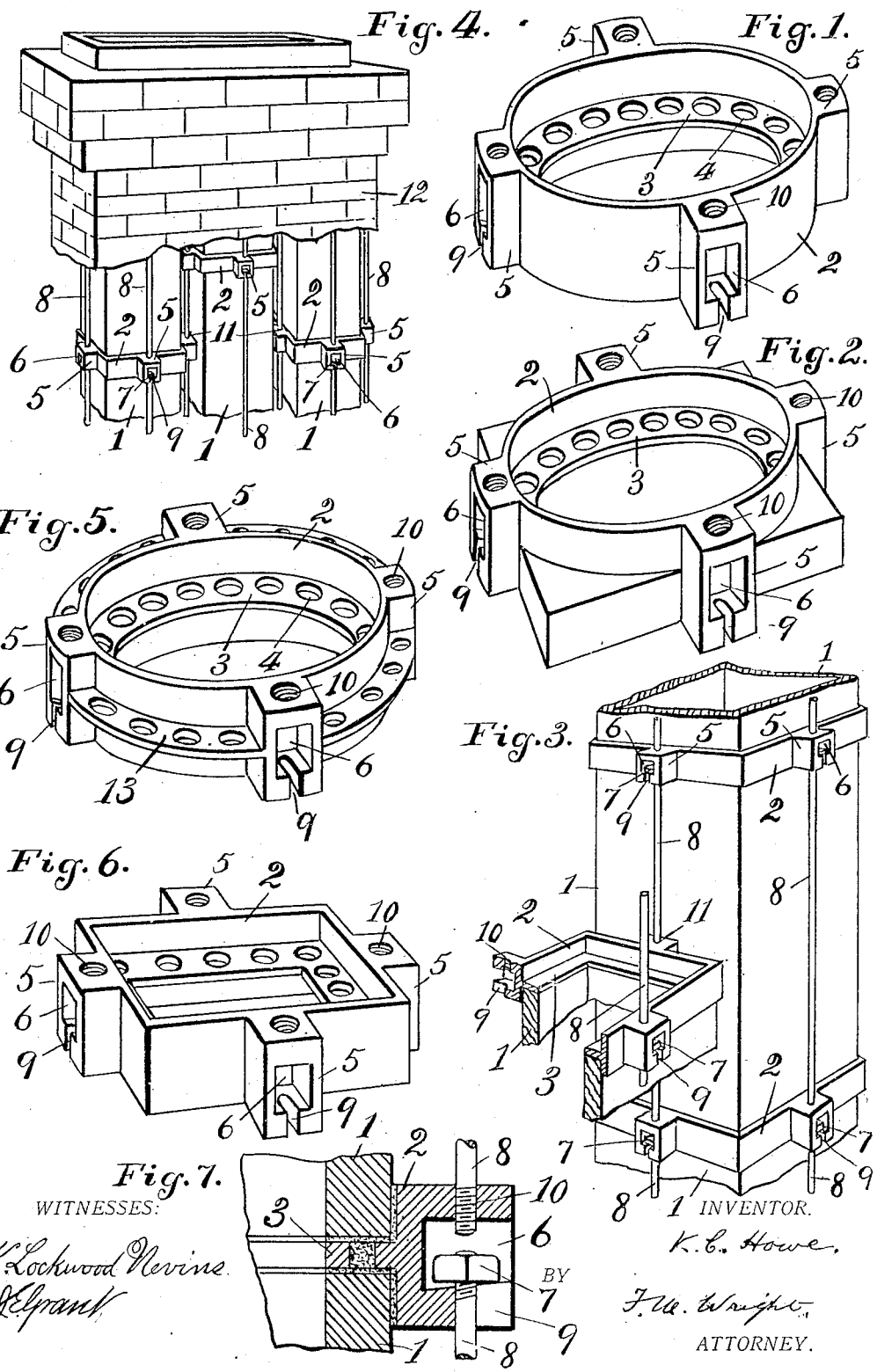
WITNESSES:
K. Lockwood Nevins
J. E. Grant
INVENTOR.
V. C. Howe.
BY
F. W. Wright,
ATTORNEY.

UNITED STATES PATENT OFFICE.

VIRGIL C. HOWE, OF SAN FRANCISCO, CALIFORNIA.

MEANS FOR CONNECTING FLUE-SECTIONS.

No. 869,710.  Specification of Letters Patent.  Patented Oct. 29, 1907.

Application filed August 7, 1906. Serial No. 329,628.

*To all whom it may concern:*

Be it known that I, VIRGIL C. HOWE, a citizen of the United States, residing at San Francisco, in the county of San Francisco and State of California, have invented new and useful Improvements in Means for Connecting Flue-Sections, of which the following is a specification.

This invention relates to improvements in collars for connecting sections of pipe, such as terra cotta pipes, to make a continuous flue or chimney and to bind adjacent flues together, the object of the invention being to provide such a collar which will permit of sections of pipe being connected and braced to each other very firmly and durably to withstand any cause tending to overturn the flue, such as great wind pressure or earthquakes.

In the accompanying drawing, Figure 1 is a perspective view of one form of collar; Fig. 2 is a similar view of another form; Fig. 3 is a broken perspective view of pipe sections joined together; Fig. 4 is a similar view of a chimney top embodying my invention; Fig. 5 is a perspective view of another form of collar; Fig. 6 is a similar view of another form; Fig. 7 is an enlarged broken sectional view through the lug of the collar.

Referring to the drawing, 1 indicates pipe sections either round or square in cross section, and formed of terra cotta or the like. These sections are joined by collars 2, each having, preferably midway thereof, an internal flange or rib 3, which rests upon the top of the lower pipe section and supports the upper pipe section, and the collar itself surrounds the adjoining ends of the two sections. Said flange 3 is formed with a sufficient number of perforations 4 to permit cement to pass freely between the two ends to firmly connect the same.

In order to brace the pipe sections throughout the entire height of the flue, each collar is provided in its periphery with lugs 5, each centrally recessed, as shown at 6 to receive a nut or bolt head 7 which is screwed on to the upper end of a tie rod 8, said upper end being passed into said recess by means of a groove or slot 9 cut in the edge of the lower wall of the recess, which wall slopes downwards inwardly so that when the nut has been screwed down upon the tie rod tight upon said lower wall, the upward and outward inclination of the wall holds the nut securely therein.

The top wall of the recess is tapped, as shown at 10, to receive the lower threaded end of the upper tie rod. But when a number of flues are placed in a chimney or casing side by side, it is desirable to tie them together, and the holes in the lugs which are opposite to adjoining flues can then be used for this purpose. They are then reamed larger to permit the rods to pass loosely therethrough, and a tie rod, screwed at its upper end into a nut 7 and at its lower end into a tapped hole 10, passes at its middle through a reamed hole 11 of a collar on an adjacent flue, which is in vertical alinement with said nut 7 and hole 10.

The advantage of providing the slot or groove 9 in the bottom of the lug to introduce the upper end of the tie rod into the recess in the rod, rather than to provide a second hole immediately beneath the hole 10 is that, in this way, the tie rods can first be made of about the right length and the nut screwed thereon to enter said recess, so that very little screwing is required, and then the nut can be screwed down tight on the end of the rod to bind the pipe sections together.

An important feature of this invention is that, instead of using a single tie rod throughout the entire height of the flue, a separate tie rod is used for connecting the two collars at the top and bottom of each pipe section. By providing these individual rods for the pipe sections, inequality in lengths can be taken up to any desired extent.

The lugs 5 serve as spacing lugs to space the flue from the galvanized iron or other casing 12 forming the chimney, but as a modification an external rib 13 may be used extending around the collar. This rib furnishes a greater bearing surface for the casing than where only a single lug is used for each side of the flue to support it against the casing.

When the collar is used at the bottom of the flue, it will be used of considerable depth below the inwardly extending flange, and the rib 13 will be of considerable width, it being important in this case to support the bottom of the flue firmly within the brickwork or other foundation upon which it rests.

I claim:—

1. Means for connecting flue sections comprising a collar adapted to surround both the adjoining ends of adjacent sections, having an internal apertured rib or flange adapted to pass between said ends, and having external lugs, cement between said ends and passing through said apertures, and tie rods each removably secured at its ends to adjacent lugs for tying adjacent collars together, substantially as described.

2. Means for connecting flue sections comprising a collar adapted to surround both the adjoining ends of adjacent sections, having an internal rib or flange adapted to pass between said ends, and having external lugs having recesses to receive nuts, the tops of the lugs having threaded apertures to receive ends of tie rods, and the bottom of the lugs having slots in their edges to receive ends thereof substantially as described.

In testimony whereof I have hereunto set my hand in the presence of two subscribing witnesses.

VIRGIL C. HOWE.

Witnesses:
R. B. TREAT,
K. LOCKWOOD NEVINS.